United States Patent

Huang

[11] Patent Number: 6,086,081
[45] Date of Patent: *Jul. 11, 2000

[54] TOY VEHICLE FRAME COMBINATION

[76] Inventor: Wan Tzu Huang, No. 86-40, Dong Ping Road, Taiping City, Taichung Hsien, Taiwan

[ * ] Notice: This patent is subject to a terminal disclaimer.

[21] Appl. No.: 09/078,653

[22] Filed: May 14, 1998

[51] Int. Cl.⁷ .................................................. B62H 9/00
[52] U.S. Cl. ........................................ 280/288.4; 280/828
[58] Field of Search ............................ 280/288.3, 288.4, 280/828; D12/111, 117, 119, 114

[56] References Cited

U.S. PATENT DOCUMENTS

| D. 276,601 | 12/1984 | Smith et al. | D12/111 |
|---|---|---|---|
| D. 375,282 | 11/1996 | Lee | D12/117 |
| D. 410,416 | 6/1999 | Huang | D12/111 |
| 2,470,441 | 5/1949 | Maier et al. | 280/288.3 |
| 2,854,249 | 9/1958 | Jaulmes | 280/288.1 |
| 4,191,269 | 3/1980 | Nagashima et al. | 180/217 |
| 4,230,332 | 10/1980 | Porsche | 280/281.1 |
| 5,314,207 | 5/1994 | Camfield et al. | 280/828 |
| 5,505,493 | 4/1996 | Camfield et al. | 280/828 |
| 5,544,907 | 8/1996 | Lin et al. | 280/288.3 |
| 5,769,442 | 6/1998 | Robinson et al. | 280/281.1 |
| 5,791,673 | 8/1998 | Paterspm | 280/281.1 |
| 5,909,896 | 8/1999 | Accerenzi | 280/828 |

*Primary Examiner*—Kevin Hurley
*Assistant Examiner*—Andrew J. Fischer

[57] ABSTRACT

A frame for a toy vehicle includes a front bar and a rear fork, and one or two covers for securing to the side portions of the bar. The bar includes a number of apertures, and the covers each includes a number of projections for engaging with the apertures of the bar and for securing the cover to the bar. The projections of one of the covers each includes a hole for engaging with the projections of the other cover and for securing the covers to the bar. The bar includes a number of reinforcing ribs and includes a notch for engaging with and for shielding a chain of the vehicle.

1 Claim, 4 Drawing Sheets

TOY VEHICLE FRAME COMBINATION

BACKGROUND OF THE INVENTION

1. Field of the Invention

The present invention relates to a toy vehicle, and more particularly to a frame combination for a toy vehicle.

2. Description of the Prior Art

Typical toy vehicles comprise a frame body made of metal materials and having a solid configuration that includes a number of metal members secured together by such as welding processes and that may not be assembled by the children. In addition, the color of the frame body may not be changed by the children themselves. Furthermore, a lot of further treating processes, such as polishing, grinding, welding, painting processes are required before the frame body may be formed.

The present invention has arisen to mitigate and/or obviate the afore-described disadvantages of the conventional frames for toy vehicles.

SUMMARY OF THE INVENTION

The primary objective of the present invention is to provide a toy vehicle frame combination which includes one or more casings that may be assembled by the children and that may be changed to various kinds of colors and/or patterns.

In accordance with one aspect of the invention, there is provided a frame combination for a toy vehicle, the frame combination comprising a frame body including a front portion having a bar and including a rear portion having a fork, the bar including at least one side portion, at least one cover to be secured to the side portion of the bar, and means for securing the cover to the bar.

The bar includes a plurality of apertures, the cover includes a plurality of projections engaged with the apertures of the bar for securing the cover to the bar. The projections of a first of the covers each includes a hole for engaging with the projections of a second of the covers and for securing the covers to the bar.

The bar includes a plurality of reinforcing ribs formed therein for reinforcing purposes. The fork includes a front portion securing to the bar and includes a rear portion, the front portion of the fork includes a size greater than that of the rear portion of the fork. The fork includes a notch formed therein for engaging with a chain of the vehicle.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
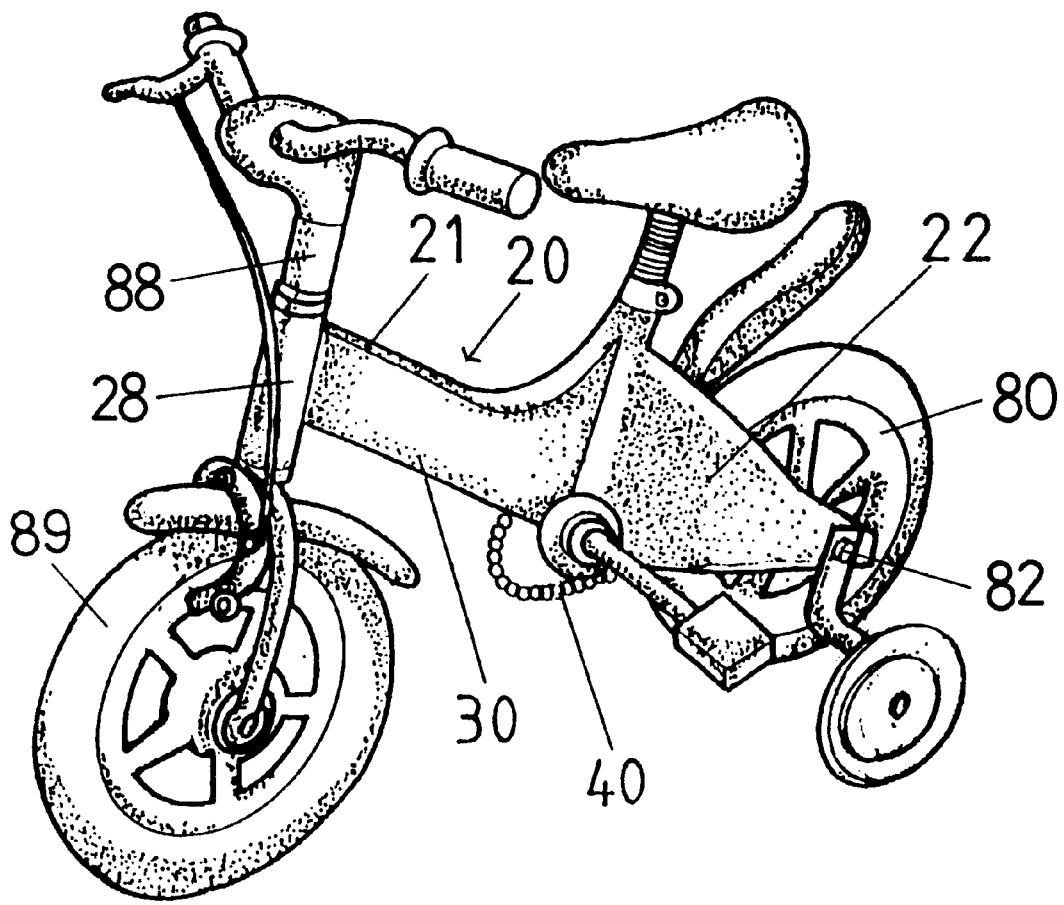
FIG. 1 is a perspective view of a toy vehicle which employs the frame combination in accordance with the present invention.
Figure 2:
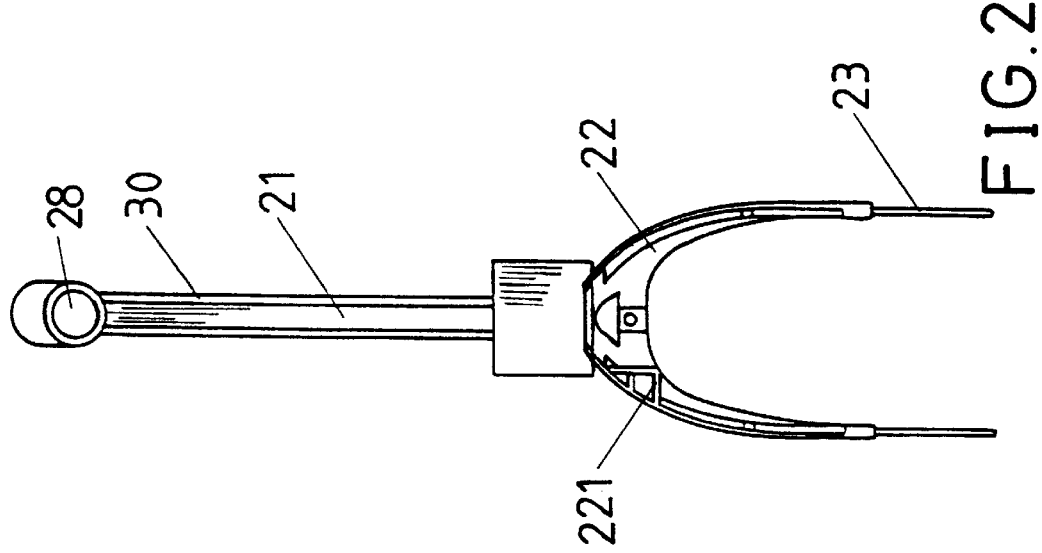
FIG. 2 is a top plan view of the frame combination.
Figure 3:
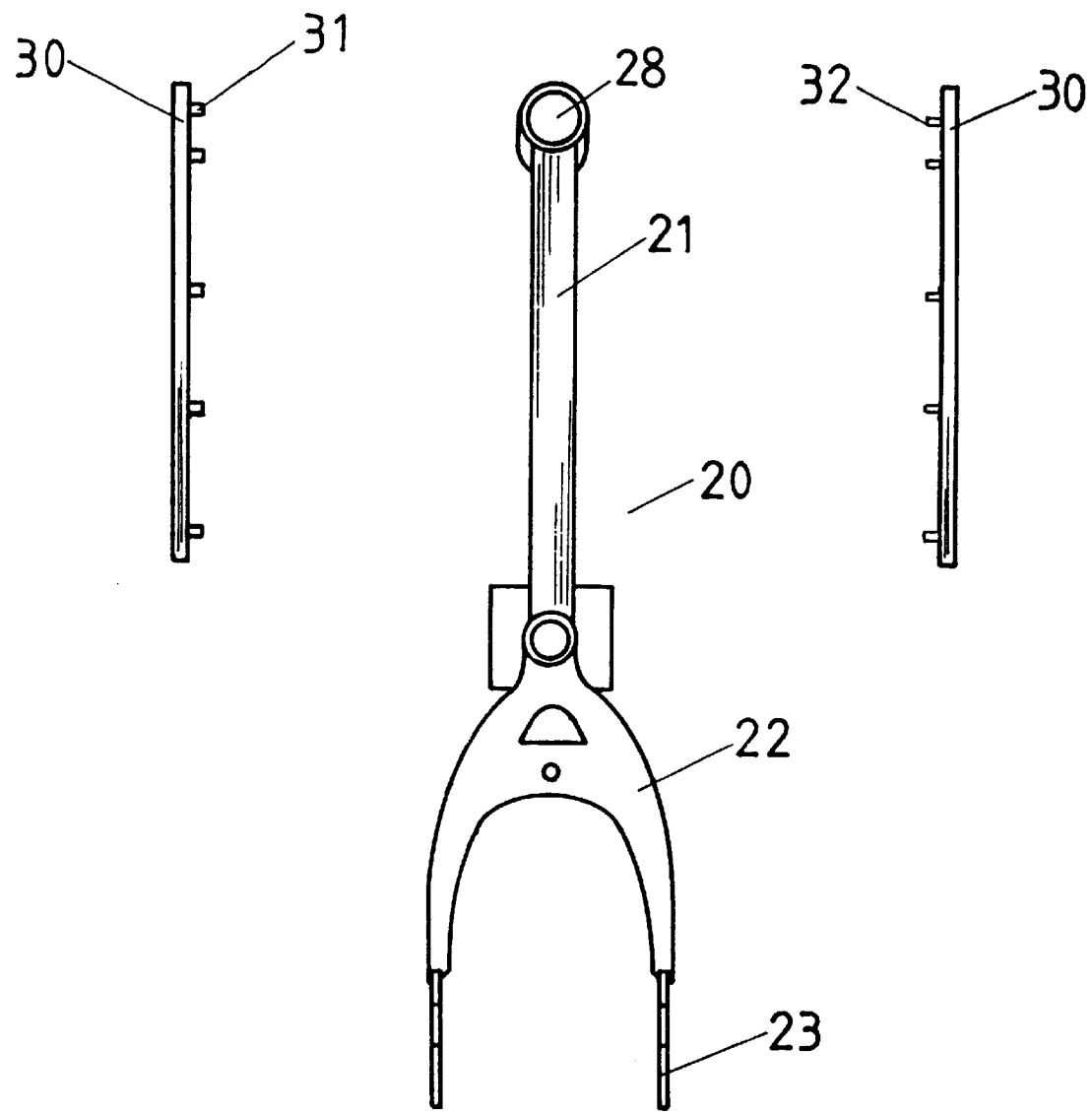
FIG. 3 is an exploded view of the frame combination which is seen from the top of the frame combination.

Referring to the drawings, and initially to FIGS. 1–3, a frame combination in accordance with the present invention is provided for a toy vehicle, particularly a toy bicycle as shown in FIG. 1, and comprises a frame body 20 having a bar 21 provided in the front portion and having a fork 22 provided in the rear portion. It is to be noted that the fork 22 includes an inverted U-shape as seen from top of the frame combination (FIGS. 2, 3), and includes a pair of rear panels 23 each having a slot 231 for engaging with the wheel axle 82 of a wheel 80 and for securing the wheel 80 to the fork 22. The bar 21 includes a sleeve 28 provided in the front portion for rotatably receiving and engaging with a steering tube 88 of the toy vehicle.

Figure 5:
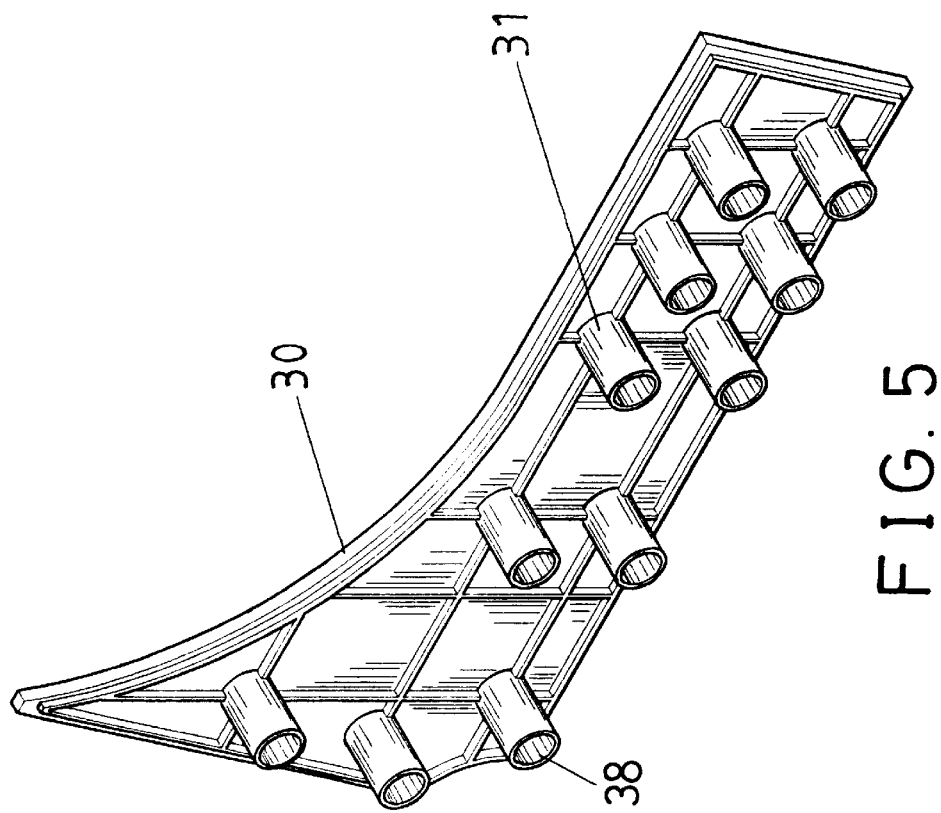
FIG. 5 is a perspective view of the cover.
Figure 4:
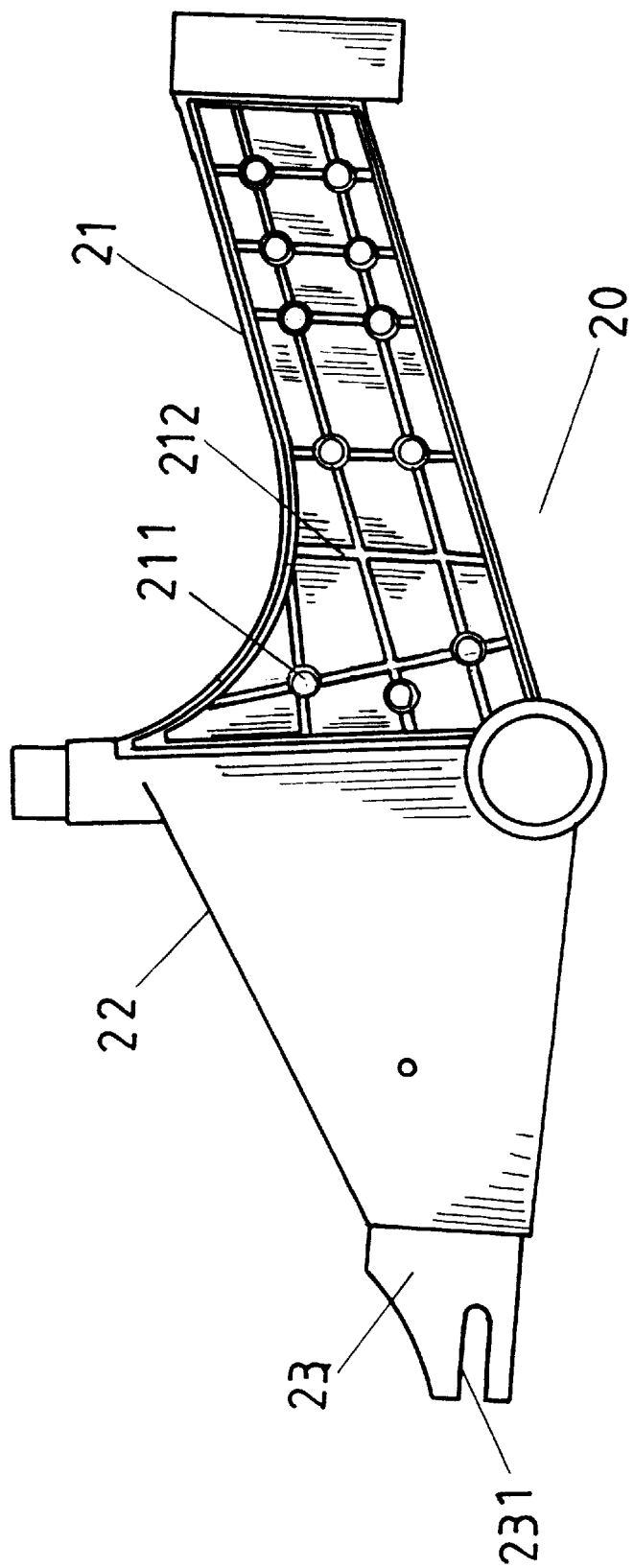
FIG. 4 is a plan view of the frame combination in which the cover has been removed.

Referring next to FIGS. 4, 5 and again to FIG. 3, the bar 21 includes a number of apertures 211 laterally formed therein and includes a number of reinforcing ribs 212 formed therein for reinforcing purposes. The frame combination including the bar 21 and the fork 22 may be formed by plastic materials and may be formed by such as molding or injection processes. A pair of covers 30 each includes a shape corresponding to that of the bar 21 for securing to the side portions of the bar 21. The covers 30 each includes a number of projections 31, 32 for engaging with the apertures 211 of the bar 21, by such as force-fitted engagement, and for securing the covers 30 to the bar 21. The frame combination may include only one cover 30 for securing to the frame body 20. The fork 22 includes a notch 221 (FIG. 2) for engaging with a chain 40 (FIG. 1) of the toy vehicle and for suitably shielding the chain 40 and for preventing the chain 40 from hurting the children.

The fork 22 includes a front portion that includes a greater thickness and that is secured to the bar 21 in production processes, such as molding process.

It is to be noted that the projections 31 of one of the covers 30 may include a greater size and may each include a hole 38 formed therein for engaging with the projections 32 with smaller size of the other cover 30, by such as the force-fitted engagement, such that the covers 30 may be easily assembled to the frame body 20 by the children themselves. The vehicle may include a number pairs of covers 30 that include various kinds of colors and/or patterns for allowing the children to replace and to change the covers 30 of different colors and/or patterns.

It is to be noted that the frame body 20 and the covers 30 of the frame combination may be easily and quickly made by molding processes, without grinding, welding, and painting processes that are required for the typical toy vehicles, and may be easily assembled by the children themselves. The covers of different colors and/or patterns may be easily changed by the children. Furthermore, the fork 22 covers the front and upper portion of the wheel 80 and may prevent the feet of the children from being engaged into the wheel 80 and from being hurt by the wheel 80.

Accordingly, the frame combination in accordance with the present invention includes one or more casings that may be assembled by the children and that may be changed to various kinds of colors and/or patterns.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A frame combination for a toy vehicle, said frame combination comprising:

a) a frame body including a front portion having a bar provided therein, and including a rear portion having a fork provided therein, said bar including two side portions each having a plurality of apertures formed therein, said bar including a plurality of reinforcing ribs formed therein for reinforcing purposes, said fork including a front portion secured to said bar and said fork including a rear portion, said front portion of said fork including a size greater than that of said rear portion of said fork, said fork including a notch formed therein;

b) a chain received in said notch of said fork; and c) two covers each including a plurality of projections engaged into said apertures of said bar for securing said covers to said side portions of said bar, a first of said covers including a plurality of hole formed in said projections respectively, said projections of a second of said covers being engaged into said holes of said projections of said first cover for securing said covers to said bar.

* * * * *